United States Patent [19]

Landers

[11] Patent Number: 4,512,502
[45] Date of Patent: Apr. 23, 1985

[54] ICE DISPENSING METHOD AND APPARATUS

[75] Inventor: Jerry L. Landers, Sellersburg, Ind.

[73] Assignee: SerVend International, Inc., Sellersburg, Ind.

[21] Appl. No.: 363,370

[22] Filed: Mar. 30, 1982

[51] Int. Cl.³ .............................................. G01F 11/20
[52] U.S. Cl. .................................... 222/413; 222/240; 62/344
[58] Field of Search .......................... 222/237, 240–242, 222/239, 148, 349, 350, 346, 345, 367, 413, 414, 410; 62/344, 340; 198/676

[56] References Cited

U.S. PATENT DOCUMENTS

| | | | | |
|---|---|---|---|---|
| 1,713,886 | 5/1929 | Benzon | ................................. | 222/413 |
| 2,692,705 | 10/1954 | Marihart | ............................. | 222/414 |
| 3,858,765 | 1/1975 | Landers | ................................ | 222/413 |
| 4,084,725 | 4/1978 | Buchser | ................................. | 62/344 |

FOREIGN PATENT DOCUMENTS

| | | | |
|---|---|---|---|
| 3002132 | 7/1981 | Fed. Rep. of Germany ...... | 222/413 |
| 689456 | 3/1953 | United Kingdom ................ | 222/240 |

*Primary Examiner*—Joseph J. Rolla
*Assistant Examiner*—Kenneth Noland
*Attorney, Agent, or Firm*—James C. Wray

[57] ABSTRACT

Ice is stored for dispensing in a semicylindrical bin. A cone-shaped wire auger is mounted on radial extensions from a sloped axle near the bottom of the bin. A large flyte of the auger pushes ice from the rear of the bin toward smaller flytes near the front of the bin. Distal ends of generally radially extending fingers sweep an opening in the front of a bottom wall. Interchangeable plates with varied size openings control dispensing rate from the bin. The large flyte pushes the ice toward the front where some of the ice drops through the dispensing opening and some of the ice is recirculated upward. Ice clusters near the dispensing opening are broken by the fingers which extend generally radially and slightly rearwardly from the axle on which the conical auger wire is mounted.

5 Claims, 6 Drawing Figures

ICE DISPENSING METHOD AND APPARATUS

BACKGROUND OF THE INVENTION

This invention relates generally to ice dispensing. Methods and apparatus for dispensing ice are described herein.

Ice dispensers of the storage bin type are well-known. Such devices often have helical augers which move the ice toward the dispensing area. Sometimes circulating augers and dispensing augers are used conjointly.

It is highly desirable that the ice circulate in a bin so that it does not form solid blocks or frozen clusters of ice cubes which may prevent dispensing of ice.

One common problem that occurs in ice cube dispensers is bridging of ice cubes or the forming of a frozen bridge of ice cubes above the auger of other conveyor. Another problem that may be encountered with ice dispensers is that ice clusters, although free to move sometimes block dispensing openings.

Another problem often associated with ice cube dispensers is that the dispensing flow rate is difficult to control and to change selectively.

The present invention has as its object the overcoming of problems existing in the prior art with simplicity of design and with minimal parts.

SUMMARY OF THE INVENTION

Ice is stored for dispensing in a semicylindrical bin. A cone-shaped wire auger is mounted on radial extensions from a sloped axle near the bottom of the bin. A large flyte of the auger pushes ice from the rear of the bin toward smaller flytes near the front of the bin. Distal ends of generally radially extending fingers sweep an opening in the front of a bottom wall. Interchangeable plates with varied size openings control dispensing rate from the bin. The large flyte pushes the ice toward the front where some of the ice drops through the dispensing opening and some of the ice is recirculated upward. Ice clusters near the dispensing opening are broken by the fingers which extend generally radially and slightly rearwardly from the axle on which the conical auger wire is mounted.

The novel features of the present invention include the cone-shaped wire auger, the jam eliminating fingers on the auger, the adapter plates for controlling the dispensing rate of ice cubes and the cylindrical-shaped bin.

A wire auger pushes ice while eliminating undesirable crushing of cubes often associated with the solid flyte auger. A cone-shaped wire auger agitates ice with the large diameter flyte at rear of the auger. The cone-shaped auger of the present invention provides a pushing force of the auger along the bottom of the bin and provides reduced pressure at the front of the auger near the dispensing opening due to the smaller diameter of the flyte.

Since the conical auger pushes more ice than it is allowed to deliver, it causes the ice in the front of the bin to move. The ice in the front of the bin can only move upward and outward, which causes the ice to climb up the front outside corners of the bin. The ice cubes move forward, up and out into the corners of the bin, which leaves a void in the back of the bin. That starts a circular movement of the ice from the back of the bin to the front. The ice strikes the front of the bin and moves up and out into the front corners and then down along the cylindrical sides toward the back of the bin where the ice is started. Complete circulation of the ice takes several operations of the auger. However, that circulating movement is what breaks up bridging or clustering of the ice.

Fingers connected to the axle which drives the conical auger are located over the dispensing opening to remove any clusters that may get over the dispensing opening, thus eliminating jamming of the dispensing opening and of the delivery chute.

The delivery rate is controlled by the size of the opening at the front of the bottom of the bin. Interchangeable plates with different size openings are installed to control the delivery rate.

The cylindrical shape of the bin is important because at the top the bin walls are steepest. The greatest amount of ice and the hardest to deliver ice is located at the top of the bin, where the walls are steepest. When the auger fractures the ice the steepness of the sides of the bin and the weight of the ice start rotating the ice down the sides of the bin to the auger for delivery to the opening.

An ice dispensing apparatus has a bin with end walls and a bottom wall. An ice dispensing opening is positioned in one of the walls. A cone-shaped wire auger is mounted between the end walls for agitating ice in the bin and for pushing ice along the bottom of the bin toward the opening, while eliminating crushing of the ice.

The cone-shaped wire auger has a larger flyte near one end wall of the bin and has a smaller flyte near an opposite end wall of the bin. Substantially radial connectors are mounted on the axle and extend outward therefrom and connect to portions of the auger for mounting the auger on the axle.

The cone-shaped wire auger is mounted on an axis which extends from one end wall to the opposite end wall. The axis slopes downward from one end wall to the opposite end wall.

The sloping axle extends into a bearing in one of the end walls and extends through a seal in the other of the end walls. A driving motor and reduction gear is connected to the axle adjacent the seal on a side thereof opposite the bin.

Radially extending fingers mounted on the axle near a lower end beak ice clusters near the fingers. Preferably the fingers are inclined from radial directions at an angle toward the axle. The opening is positioned beneath the fingers. As the axle turns, distal ends of the fingers sweep adjacent the opening.

Preferably the bin is semicircular in shape. End walls are substantially semicircular, and the side and bottom walls are substantially smoothly curved in semicylindrical shape.

An adapter plate having an opening therein is connected to a wall of the bin. The adapter plate is replaceable with other adapter plates having openings of varied size for controlling the size of the opening and thus controlling dispensing rate of ice flowing through the opening.

Preferably the dispenser adapter plate is mounted in a bottom wall of the bin adjacent a smaller end of the cone-shaped wire auger.

A method of dispensing ice cubes described herein includes storing ice cubes in a bin and pushing ice cubes along a bottom of the bin with a cone-shaped auger having a large diameter flyte at a rear of the bin and a small diameter flyte near a front of the bin and dispensing ice through an opening near the front of the bin.

Preferably a wire auger pushes the ice and moves excess ice in the front of the bin upward away from a dispensing opening. The method includes breaking ice clusters adjacent the opening by rotating an axle having generally radially aligned fingers and sweeping an area adjacent the opening with distal ends of the fingers.

The method includes controlling dispensing rate from the bin by changing plates having varied size openings to control the ice dispensing opening size.

The method the present invention includes pushing ice with a cone-shaped wire auger which is mounted on radial extensions on an axle and sloping the axle from a relatively high position adjacent a rear of the bin to a relatively low position adjacent a front of the bin and rotating the axle and auger with a motor outside of the bin.

These and further and other objects and features of the invention are apparent in the disclosure which resides in the above and ongoing specification, including the claims, and the drawings.

DETAILED DESCRIPTION OF THE DRAWINGS

Figure 1:
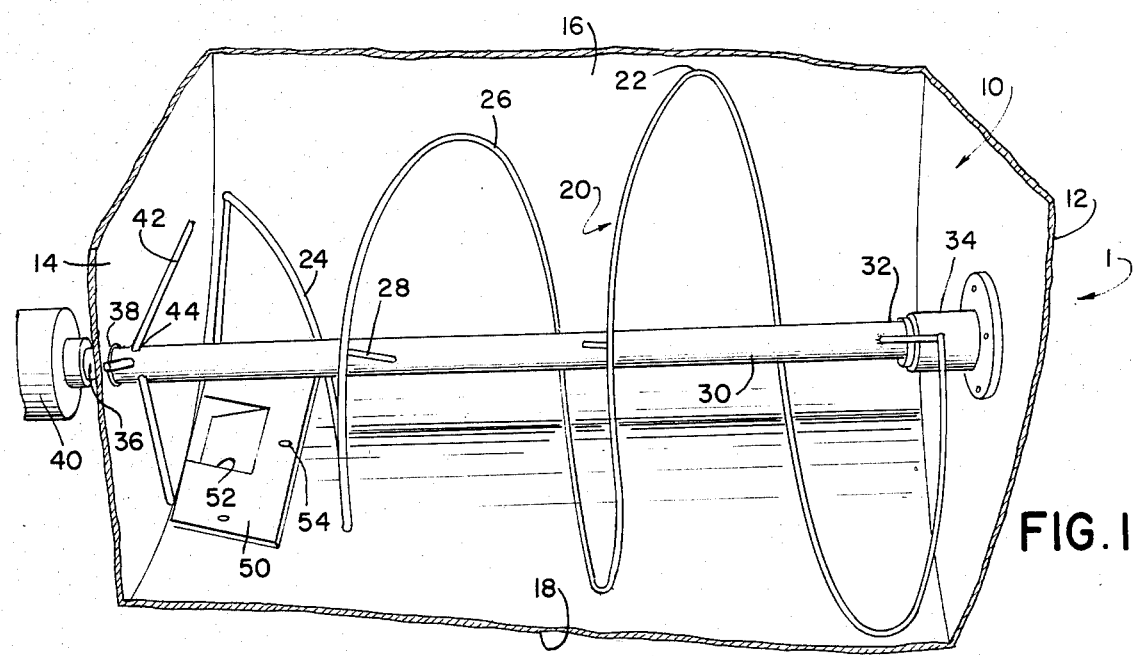
FIG. 1 it is a view of the cylindrical auger and fingers mounted on an axle which is driven by a motor.
Figure 2:
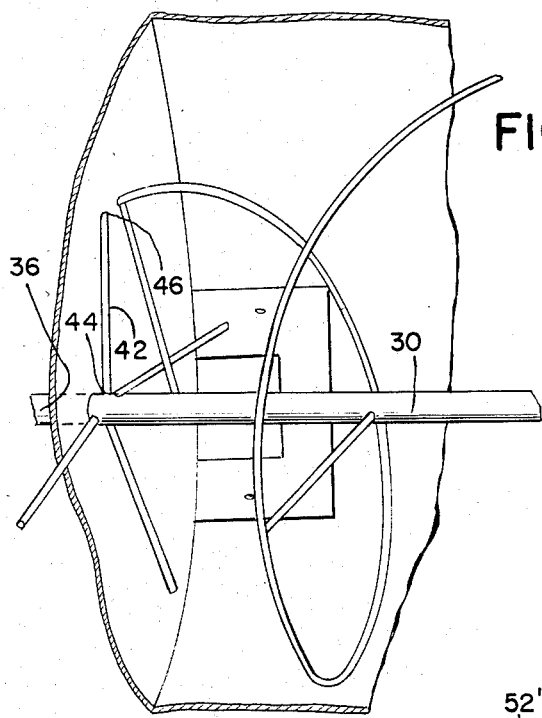
FIG. 2 is another partial view of the bin, cylindrical auger, fingers and discharge opening.
Figure 3:
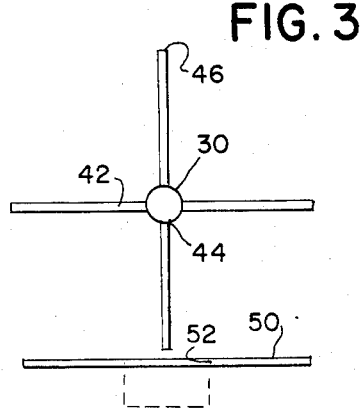
FIG. 3 is a detailed front elevation showing the relationship of the fingers to the discharge opening.

In FIG. 1 an ice dispenser is generally indicated by the numeral 1. Ice storage bin 10 has a rear wall 12 and a front wall 14. Side walls 16 and bottom wall 18 complete the ice storage bin. A cone-shaped wire auger 20 is positioned in the bin so the flytes of the auger closely approach bottom 18 of the bin as the auger is turned.

Large flyte 22 is positioned near rear wall 12, and small flyte 24 is positioned near the discharge opening. Intermediate flytes 26 of decreasing size form an outer cone shape between the larger flyte 22 and the smaller flyte 24. The cone-shaped helical wire auger 20 is supported on axle 30 by a plurality rods 28 which extend between axle 30 and the rigid wire 20 which forms the conical auger. Wire rods 28 are connected on inner-ends such as by welding to the axle 30. Outer ends of rods 28 are welded to the rigid wire which forms auger 20. Multiple number of radial support rods 28 are employed. One rod is connected between an end of the large flyte 22 and the axle 30; another rod is connected between the end of small flyte 24 and axle 30, and other rods are spaced along axle 30 between the ends of the auger. In one form of the invention, axle 30 is a solid or a hollow shaft. Holes are drilled diametrically through the shaft, and rods 28 are press-fitted in the holes and additionally may be welded to the holes on both sides thereof.

Axle shaft 30 has an end 32 which fits within bearing 34 mounted on rear wall 12. A forward end 36 of axle shaft 30 is elongated to extend through a seal 38 in forward wall 14. The forward end 36 of the axle shaft is connected to suitable reduction gearing and an electric motor, generally indicated by the numeral 40. Plural fingers 42 are mounted on shaft 30 in the vicinity of the discharge opening. Inner ends 44 of fingers 42 are welded to the shaft, and distal ends 46 are free to sweep adjacent the discharge opening to move ice clusters away from the discharge opening and to break up such clusters. The fingers 42 are arranged generally radially in groups of four. In a preferred embodiment as shown in the drawings the fingers are angled rearward toward shaft 30 away from a radial direction.

Figure 4A:
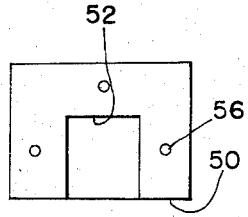
FIGS. 4a and 4b show discharge opening plates with varied size openings.
Figure 4B:
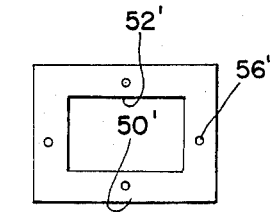

A plate 50 having a discharge opening 52 is removably secured with fasteners 54 at a forward end of bottom wall 18. The opening 52 controls the dispensing rate of the ice cubes. A faster rate may be provided with discharge plate 50' which has an enlarged opening 52' as shown in the drawings. Fasteners 54 are interchangeably positioned in holes 56 and 56' as shown in FIG. 4a and 4b.

Figure 5:
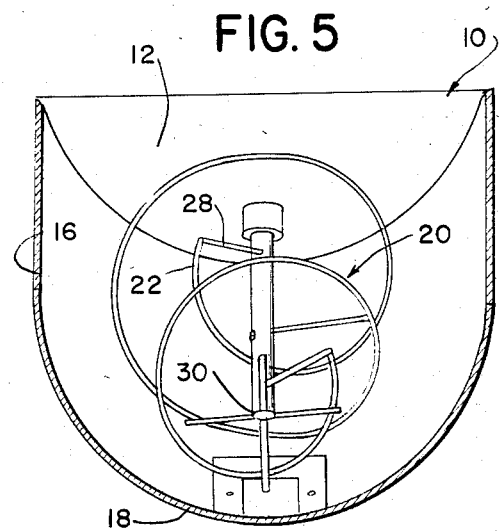
FIG. 5 is a cross-sectional detail showing the cylindrical auger and the cylindrical shape of the bin.

The cylindrical shape of the bin 10 is generally shown in the cross section which is FIG. 5. The cylindrical auger 20 shown in cutaway view has a large flyte 22 which is connected at its end to rod 28. As shown in the drawings, the inward end of rod 28 extends through shaft 30 and is welded to the shaft at both sides. The rigid wire in auger 20 closely approaches the bottom wall 18 as the auger turns. In the preferred embodiments side walls 16 and bottom wall 18 form a semicylindrical wall which is closed at opposite ends such as by semicircular rear wall 12.

In operation, bin 10 is filled with ice cubes, which are held in the bin at the low freezing temperatures. Upon occasion, moisture within the bin freezes or the ice cubes otherwise are caused to stick together and form bridges or clusters. Upon demand, the motor is turned to drive the shaft 30 and auger 20 in a dispensing cycle. Auger 20 pushes the ice along the bottom wall 18 toward the opening 52. The turning of the auger and the pushing of the ice cubes along the floor tends to break any bridges and tends to force ice cubes forward and upward along forward corners of the side walls.

As any clusters of ice are pushed forward to the opening the rotating fingers 42 sweep the clusters away from the discharge opening 52 and tend to break the clusters. Ice tends to move down the cylindrical side walls, replacing ice which has moved forward and creating full circulation within the bin 10. Several dispensing cycles each having multiple rotations of the shaft 30 and auger 20 cause full circulation of the ice within the bin.

While the invention has been described with reference to specific embodiments, modifications and variations of the invention may be constructed without departing from the scope of the invention.

The scope of the invention is defined in the following claims.

I claim:

1. An ice dispensing apparatus comprising a horizontally oriented bin having end walls, side walls and a bottom wall, an ice dispensing opening in one of the walls, and a cone-shaped wire auger mounted between end walls for agitating the ice in the bin and for pushing ice along the bottom of the bin axially toward the opening, while eliminating crushing of the ice, said bin being semicircular in shape, wherein the end walls are substantially semicircular and wherein the side and bottom walls are substantially smoothly curved in semicylindrical shape, the cone-shaped wire auger having a large flyte near one end wall of the bin and having a smaller flyte near an opposite end wall of the bin, the cone-shaped wire auger being mounted on an eccentrically positioned axle which extends from one end wall to the opposite end wall, the axle sloping downward from the end wall opposite the opening to the end wall adjacent the opening and extending into a bearing in one of the side walls and extending through a seal in the other of the side walls, and a driving means connected to the axle adjacent the seal on a side thereof opposite the bin, a few substantially radial connectors mounted in the axle and extending outward therefrom and connected to portions of the auger for mounting the auger on the axle, the connectors being non-perpendicular to the auger axle, generally radially extending fingers mounted on the axle near a lower end thereof for breaking ice clusters near the fingers, the fingers being angled slightly toward the axle, the fingers being inclined from radial directions at an angle toward the axle, and the opening being positioned beneath the fingers, whereby as the axle turns, distal ends of the fingers sweep adjacent the opening, and an opening plate secured to a bottom wall of the bin adjacent a side wall thereof and wherein the opening plate is removable and replaceable with a plate having an opening of a different size to control flow of ice from the bin according to selected size of the opening in the selected plate.

2. The ice dispensing apparatus of claim 1 further comprising an adapter plate having the opening therein and means for connecting the adapter plate to a wall of the bin, the adapter plate being replaceable with other adapter plates having openings of varied size for controlling the size of the opening and thus controlling dispensing rate of ice flowing through the opening, the adapter plate being mounted in a bottom wall of the bin adjacent a smaller end of the cone-shaped wire auger.

3. The ice dispensing apparatus of claim 2 wherein the dispenser plate is mounted in a bottom wall of the bin adjacent a smaller end of the cone-shaped wire auger.

4. The ice dispensing apparatus of claim 1 further comprising wire fingers generally radially mounted on an axle positioned above the opening for breaking ice clusters adjacent the opening, the wire fingers being inclined slightly toward the axle from radii thereof.

5. The ice dispensing apparatus of claim 4 wherein the wire fingers are inclined slightly toward the axle from radii thereof.

* * * * *